US007831378B2

(12) United States Patent
Wills

(10) Patent No.: US 7,831,378 B2
(45) Date of Patent: Nov. 9, 2010

(54) SYSTEM AND METHOD FOR ESTIMATING NOX PRODUCED BY AN INTERNAL COMBUSTION ENGINE

(75) Inventor: J. Stephen Wills, Columbus, IN (US)

(73) Assignee: Cummins Inc., Columbus, IN (US)

( * ) Notice: Subject to any disclaimer, the term of this patent is extended or adjusted under 35 U.S.C. 154(b) by 486 days.

(21) Appl. No.: 11/928,195

(22) Filed: Oct. 30, 2007

(65) Prior Publication Data

US 2009/0112445 A1 Apr. 30, 2009

(51) Int. Cl.
*G06F 19/00* (2006.01)
*F02D 41/00* (2006.01)

(52) U.S. Cl. ....................................... 701/114; 123/674

(58) Field of Classification Search ......... 701/103–105, 701/109, 110, 114, 115; 123/434, 435, 436, 123/672, 674; 60/285, 301
See application file for complete search history.

(56) References Cited

U.S. PATENT DOCUMENTS 5,577,382 A 11/1996 Kihara et al.
5,595,060 A 1/1997 Togai et al.
6,345,498 B2 2/2002 Yonekura et al.
6,490,856 B2 * 12/2002 Bidner et al. ................. 60/274
6,505,465 B2 * 1/2003 Kanazawa et al. ............ 60/278
6,574,954 B2 6/2003 Wakui et al.
6,697,729 B2 2/2004 Wright
6,698,188 B2 3/2004 Irisawa et al.
6,775,623 B2 8/2004 Ali et al.
7,363,758 B2 * 4/2008 Surnilla et al. ................ 60/285
2002/0112469 A1 * 8/2002 Kanazawa et al. ............ 60/285
2006/0096277 A1 * 5/2006 Surnilla et al. ................ 60/286
2009/0112445 A1 * 4/2009 Wills .......................... 701/108

OTHER PUBLICATIONS

PCT International Search Report and Written Opinion dated Jan. 30, 2009 relating to PCT/US2008/073554.

* cited by examiner

*Primary Examiner*—John T Kwon
(74) *Attorney, Agent, or Firm*—Barnes & Thornburg LLP; J. Bruce Schelkopf

(57) ABSTRACT

A system and method are provided for estimating NOx produced by an internal combustion engine. The flow rate of fuel supplied to the engine and a plurality of engine operating parameters are monitored. NOx produced by the engine is estimated based on a product of the flow rate of fuel and a function of the plurality of engine operating parameters. The NOx estimate is stored in memory.

24 Claims, 5 Drawing Sheets

SYSTEM AND METHOD FOR ESTIMATING NOX PRODUCED BY AN INTERNAL COMBUSTION ENGINE

FIELD OF THE INVENTION

The present invention relates generally to systems and methods for determining components of exhaust gas produced by internal combustion engines, and more specifically to systems and methods for estimating NOx produced by internal combustion engines.

BACKGROUND

When combustion occurs in an environment with excess oxygen, peak combustion temperatures increase which leads to the formation of unwanted engine emissions, such as oxides of nitrogen, e.g., NOx. It is desirable to determine the amount and/or rate of NOx produced by the operation of an internal combustion engine for diagnostic and/or engine control purposes.

SUMMARY

The present invention may comprise one or more of the features recited in the attached claims, and/or one or more of the following features and combinations thereof. A method of estimating NOx produced by an internal combustion engine may comprise monitoring a flow rate of fuel supplied to the engine, monitoring a plurality of engine operating parameters, estimating NOx produced by the engine based on a product of the flow rate of fuel and a function of the plurality of engine operating parameters, and storing the NOx estimate in memory.

Monitoring a flow rate of fuel, monitoring a plurality of engine operating parameters, estimating NOx produced by the engine and storing the NOx estimate in memory may be carried out once per engine cycle. Storing the NOx estimate in memory may comprise adding the NOx estimate to an accumulated NOx estimate value in memory.

The method may further comprise determining a number of model constants. Estimating NOx may comprise estimating NOx produced by the engine based on a product of a function of the flow rate of fuel and at least one of the model constants and a function of the plurality of engine operating parameters and remaining ones of the model constants.

Storing the NOx estimate in memory may comprise adding the NOx estimate to an accumulated NOx estimate value in memory.

Monitoring a plurality of engine operating parameters may comprise determining a charge mass value corresponding to a mass of charge entering the engine. Determining a charge mass value may comprise determining a charge flow value corresponding to a flow rate of charge entering the engine, determining a rotational speed of the engine, and determining the charge mass value as a function of the charge flow value and the rotational speed of the engine.

Monitoring a plurality of engine operating parameters may comprise determining a charge composition value corresponding to at least a partial composition of charge entering the engine. Determining a charge composition value may comprise determining an EGR fraction value corresponding to a fraction of recirculated exhaust gas in the charge entering the engine. Determining an EGR fraction value may comprise determining a charge flow value corresponding to a flow rate of charge entering the engine, determining an EGR flow value corresponding to a flow rate of recirculated exhaust gas entering the engine, and determining the EGR fraction value as a function of the charge flow value and the EGR flow value. Determining a charge composition value may further comprise determining a second order EGR fraction value as a function of the EGR fraction value.

Monitoring a plurality of engine operating parameters may alternatively or additionally comprise determining a charge temperature value corresponding to a temperature of charge entering the engine. Monitoring a plurality of engine operating parameters may alternatively or additionally comprise determining a fuel timing value corresponding to a timing of fuel supplied to the engine relative to a reference timing value. Monitoring a plurality of engine operating parameters may alternatively or additionally comprise determining a rotational speed of the engine. Monitoring a plurality of engine operating parameters may alternatively or additionally comprise determining an operating temperature of the engine. Determining an operating temperature of the engine may comprise determining a coolant temperature corresponding to a temperature of coolant circulating through the engine. Alternatively or additionally, determining an operating temperature of the engine may comprise determining a temperature of oil within the engine.

A fuel system may include a fuel rail fluidly coupled to a number of fuel injectors. The number of fuel injectors may be configured to selectively supply fuel to the engine from the fuel rail. Monitoring a plurality of engine operating parameters may comprise determining a fuel rail pressure corresponding to a pressure of fuel within the fuel rail.

Each of the plurality of engine operating parameters may be represented by an engine operating parameter variable $T_N$, where N is a positive integer greater than 1. The function of the plurality of engine operating parameters may be of the form $(T_1+T_2+ \ldots +T_N)$. The method may further comprise determining a number of model constants. Estimating NOx may comprise estimating NOx produced by the engine ($NOx_E$) according to the equation $NOx_E=(K*FF)*(T_1+T_2+ \ldots +T_N)$, where FF is the flow rate of fuel and K is one of the number of model constants. The function of the plurality of engine operating parameters may be of the form $[(C_1*T_1)+(C_2*T_2)+ \ldots +(C_N*T_N)]$, where $C_1, C_2, \ldots, C_N$ are remaining ones of the number of model constants.

A method of estimating NOx produced by an internal combustion engine may comprise determining a fuel flow rate corresponding to a flow rate of fuel supplied to the engine, determining a fuel timing corresponding to a timing of fuel supplied to the engine relative to a reference timing value, determining an engine speed corresponding to rotational speed of the engine, determining a charge mass corresponding to a mass of charge entering the engine, determining a charge composition corresponding to at least a partial composition of charge entering the engine, determining a charge temperature corresponding to a temperature of charge entering the engine, estimating NOx produced by the engine as a function of the fuel flow rate, fuel timing, engine speed, charge mass, charge composition and charge temperature, and storing the NOx estimate in memory.

Determining a fuel flow rate, determining a fuel timing, determining an engine speed, determining a charge mass, determining a charge composition, determining a charge composition, estimating, estimating NOx produced by the engine and storing the NOx estimate in memory may be carried out once per engine cycle. The method may further comprise monitoring engine cycles by monitoring a position of the engine relative to a reference engine position. Storing the NOx estimate in memory may comprise adding the NOx estimate to an accumulated NOx estimate value in memory.

The method may further comprise determining a number of model constants, wherein estimating NOx comprises estimating NOx produced by the engine further as a function of the number of model constants. Estimating NOx may comprise estimating NOx produced by the engine ($NOx_E$) according to the function $NOx_E=(K*FF)[(C_1*C_M)+(C_2*C_C)+(C_3*C_T)+(C_4*F_T)+(C_5*ES)+C6]$, where FF is the fuel flow rate, $C_M$ is the charge mass, $C_C$ is the charge composition, $C_T$ is the charge temperature, FT is the fuel timing, ES is the engine speed, and K and $C_1$-$C_6$ are the number of model constants. Determining a charge mass may comprise determining a charge flow corresponding to a flow rate of charge entering the engine, and determining the charge mass as a function of the charge flow and the engine speed. Determining a charge composition may comprise determining an EGR fraction corresponding to a fraction of recirculated exhaust gas in the charge supplied to the engine. Determining an EGR fraction may comprise determining an EGR flow corresponding to a flow rate of recirculated exhaust gas entering the engine, and determining the EGR fraction value as a function of the charge flow and the EGR flow. Determining a charge composition value may further comprise determining a second order EGR fraction value as a function of the EGR fraction value, and computing the charge composition value as a sum of the EGR fraction value and the second order EGR fraction value such that estimating NOx comprises estimating NOx produced by the engine according to the function $NOx_E=(K*FF)[(C_1*f(CF,ES))+(C_2[EGR_F+f(EGR_F))+(C_3*C_T)+(C_4*FT)+(C_5*ES)+C_6]$, where CF is the charge flow, f(CF, ES) is the charge mass, $EGR_F$ is the EGR fraction value and $f(EGR_F)$ is the second order EGR fraction value.

A system for estimating NOx produced by an internal combustion engine, the system may comprise a fuel system coupled to a source of fuel and to the engine and configured to supply fuel from the source of fuel to the engine, and a control circuit including a memory having stored therein instructions that are executable by the control circuit to determine a fuel flow value corresponding to a flow rate of fuel supplied by the fuel system to the engine, to determine a plurality of operating parameters associated with operation of the engine and to estimate NOx produced by the engine as a product of the fuel flow value and a function of the plurality of operating parameters.

The instructions may further include instructions that are executable by the control circuit to store a value of the estimated NOx in the memory.

The memory may include an accumulator having stored therein an accumulated NOx estimate value. The instructions may further include instructions that are executable by the control circuit to add the estimated NOx to the accumulated NOx estimate value stored in the memory.

The system may further comprise an engine position sensor configured to produce an engine position signal corresponding to a rotational position of the engine relative to a reference position. The instructions may further include instructions to process the engine position signal to produce an engine position value, to monitor the engine position value, and to determine the fuel flow value, determine the plurality of operating parameters and to estimate the NOx produced by the engine once per engine cycle.

The system may further comprise means for determining a charge mass value corresponding to a mass of charge entering the engine, means for determining a charge composition value corresponding to at least a partial composition of the charge entering the engine, means for determining a charge temperature corresponding to a temperature of the charge entering the engine, means for determining a fuel timing value corresponding to a timing fuel supplied to the engine relative to a reference time value, and means for determining an engine speed value corresponding to a rotational speed of the engine. The plurality of operating parameters associated with operation of the engine may include the charge mass value, the charge composition value, the charge temperature value, the fuel timing value and the engine speed value. The system may further comprise a number of model constants stored in the memory. The instructions may further include instructions to estimate the NOx produced by the engine ($NOx_E$) according to the equation $NOx_E=(K*FF)[(C_1*C_M)+(C_2*C_C)+(C_3*C_T)+(C_4*FT)+(C_5*ES)+C6]$, where FF is the fuel flow rate, $C_M$ is the charge mass, $C_C$ is the charge composition, $C_T$ is the charge temperature, FT is the fuel timing, ES is the engine speed, and K and $C_1$-$C_6$ are the number of model constants. The means for determining a charge composition value may comprise means for determining an EGR fraction value corresponding to a fraction of recirculated exhaust gas in the charge entering the engine. The means for determining a charge composition value may further comprise means for determining a second order EGR fraction value as a function of the EGR fraction value and for determining the charge composition value as a sum of the EGR fraction value and the second order EGR fraction value.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
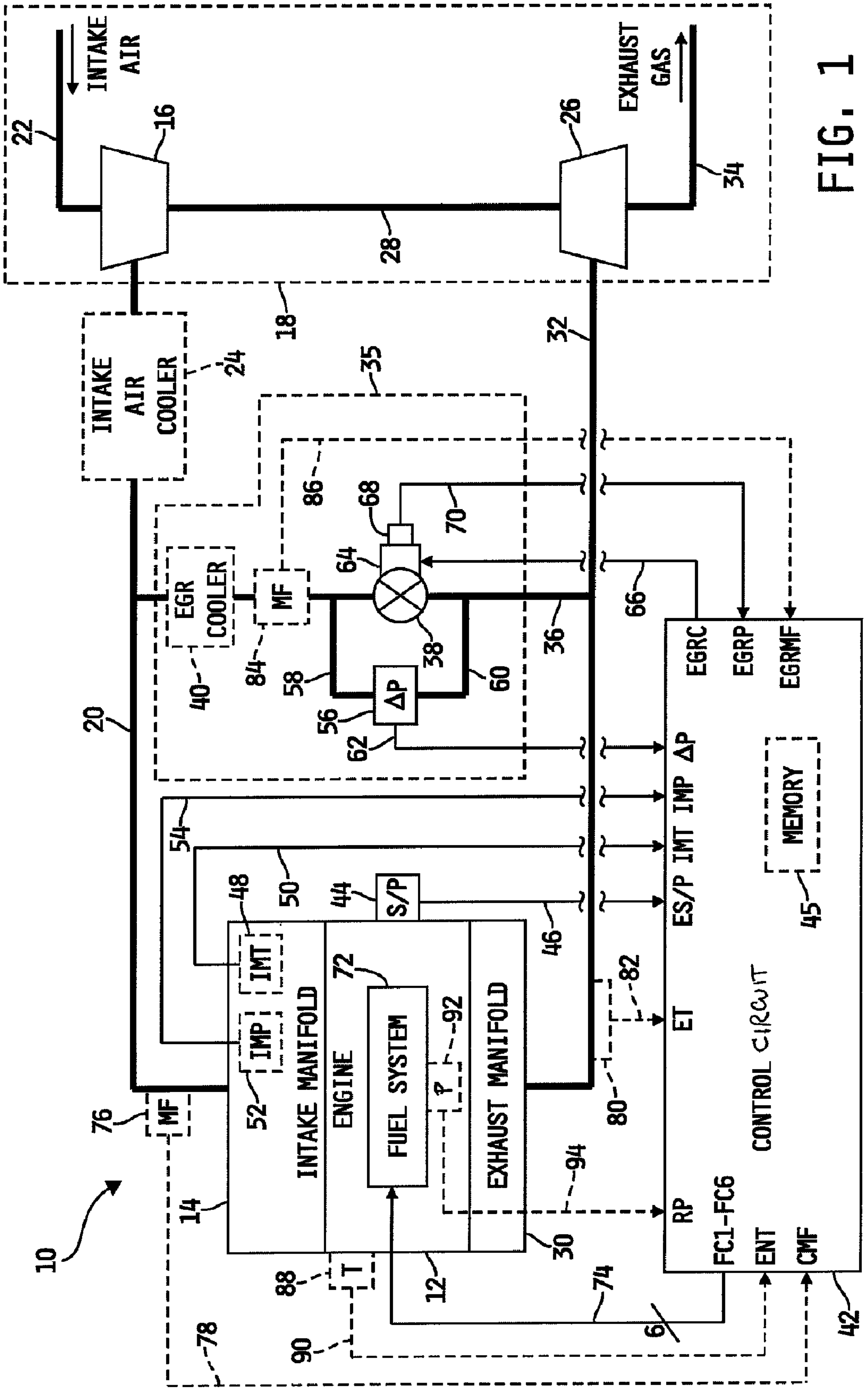
FIG. 1 is a block diagram of one illustrative embodiment of a system for estimating NOx produced by an internal combustion engine.

Referring now to FIG. 1, a diagrammatic illustration of one illustrative embodiment of a system 10 for estimating NOx produced by an internal combustion engine is shown. In the illustrated embodiment, the system 10 includes an internal combustion engine 12 having an intake manifold 14 fluidly coupled to an outlet of a compressor 16 of a turbocharger 18 via an intake conduit 20. The compressor 16 includes a compressor inlet coupled to an intake conduit 22 for receiving fresh air. In some embodiments, as shown in phantom in FIG. 1, system 10 may include an intake air cooler 24 of known construction disposed in line with intake conduit 20 between the turbocharger compressor 16 and the intake manifold 14. The turbocharger compressor 16 is mechanically coupled to a turbocharger turbine 26 via a rotating drive shaft 28, and the turbine 26 includes a turbine inlet fluidly coupled to an exhaust manifold 30 of engine 12 via an exhaust conduit 32. The turbine 26 includes a turbine outlet fluidly coupled to ambient via an exhaust conduit 34. The turbocharger 18 is shown in FIG. 1 outlined by a dashed-line box to indicate that some embodiments, such as the illustrated embodiment, may include the turbocharger 18 while others may not. Accordingly, the turbocharger 18 is not an essential component for estimating NOx produced by the engine 12 in accordance with this disclosure, although in embodiments that include the turbocharger 18 one or more engine operating parameters associated with the operation of the turbocharger 18 that affect the amount and/or rate of NOx produced by the engine 12 may be taken into account when estimating NOx in accordance with this disclosure.

In the embodiment illustrated in FIG. 1, the system 10 further includes an exhaust gas recirculation (EGR) system 35 including an EGR valve 38 disposed in-line with an EGR conduit 36 that is fluidly coupled at one end to the intake conduit 20 and an opposite end to the exhaust conduit 32. An EGR cooler 40 of known construction may optionally be disposed in-line with the EGR conduit 36 between the EGR valve 38 and the intake conduit 20 as shown in phantom in FIG. 1. The EGR system 35 is shown in FIG. 1 outlined by a dashed-line box to indicate that some embodiments, such as the illustrated embodiment, may include the EGR system 35 while others may not. Accordingly, the EGR system 35 is not an essential component for estimating NOx produced by the engine 12 in accordance with this disclosure, although in embodiments that include the EGR system 35 one or more engine operating parameters associated with the operation of the EGR system 35 that affect the amount and/or rate of NOx produced by the engine 12 may be taken into account when estimating NOx in accordance with this disclosure. This disclosure further contemplates so-called "in-cylinder" EGR systems in which valve timing is manipulated such that some amount of combusted charge remains in the cylinders, and that one or more engine operating parameters associated with the operation of such EGR systems that affect the amount and/or rate of NOx produced by the engine 12 may likewise be taken into account when estimating NOx in accordance with this disclosure.

The system 10 includes a control circuit 42 that is generally operable to control and manage the overall operation of the engine 12. The control circuit 42 includes a memory unit 45 as well as a number of inputs and outputs for interfacing with various sensors and systems coupled to the engine 12. The control circuit 42, is illustratively microprocessor-based, although this disclosure contemplates other embodiments in which the control circuit 42 may alternatively be or include a general purpose or application specific control circuit capable of operation as will be described hereinafter. In any case, the control circuit 42 may be a known control unit sometimes referred to as an electronic or engine control module (ECM), electronic or engine control unit (ECU) or the like. Illustratively, the memory 45 of the control circuit 42 has stored therein one or more sets of instructions that are executable by the control circuit 42, as will be described in greater detail hereinafter, to estimate NOx produced by the engine 12.

The control circuit 42 includes a number of inputs for receiving signals from various sensors or sensing systems associated with system 10. For example, system 10 includes an engine speed and position sensor 44 that is electrically connected to an engine speed and position input, ES/P, of the control circuit 42 via a signal path 46. The engine speed and position sensor 44 is conventional and is operable to produce a signal from which the rotational speed of the engine, ES, and the position of the engine, EP, relative to a reference position, can be conventionally determined. The engine position, EP, may, for example, be or include an angle of the engine crankshaft (not shown), i.e., crank angle, relative to a reference crank angle, e.g., top-dead-center (TDC) of a specified one of the pistons (not shown). In one embodiment, the sensor 44 is a Hall effect sensor operable to determine engine speed and position by sensing passage thereby of a number of spaced-apart teeth formed on a gear or tone wheel. Alternatively, the engine speed and position sensor 44 may be any other known sensor operable as just described including, but not limited to, a variable reluctance sensor or the like. Alternatively still, the engine speed and position sensor 44 may be provided in the form of two separate sensors; one that senses only engine rotational speed and the other that senses only engine position.

The system 10 further includes an intake manifold temperature sensor 48 disposed in fluid communication with the intake manifold 14 of the engine 12, and electrically connected to an intake manifold temperature input, IMT, of the control circuit 42 via a signal path 50. The intake manifold temperature sensor 48 may be of known construction, and is operable to produce a temperature signal on the signal path 50 that is indicative of the temperature of a "charge" flowing into the intake manifold 14. The term "charge," for purposes of this disclosure is generally defined as the gas that will be mixed with fuel for combustion within the cylinders of the engine. In embodiments that include an "in-cylinder" EGR system as briefly described above, the term "charge" is defined as a combination of the fresh air flowing into the intake manifold 14 via the conduit 20 and the remaining, i.e., leftover, combusted gas in the cylinders from the previous combustion cycle of the engine 12. In embodiments that do not include an "in-cylinder" EGR system, the term "charge" is defined as the gas flowing into the intake manifold 14 that will be mixed with fuel to be combusted within the cylinders of the engine. In embodiments that include the EGR system 35, for example, the charge flowing into the intake manifold 14 is generally made up of fresh air supplied to the intake conduit 20, which may or may not be supplied by the turbocharger compressor 16 depending upon whether the system 10 includes the turbocharger 18, combined with recirculated exhaust gas supplied by the EGR valve 38. In embodiments that do not include the EGR system 35 or an "in-cylinder" EGR system, for example, the charge flowing into the intake manifold 14 is generally the fresh air supplied to the intake conduit 20, which may or may not be supplied by the turbocharger compressor 16 depending upon whether the system 10 includes the turbocharger 18. Although the intake manifold temperature sensor 48 is illustrated in FIG. 1 as being positioned in fluid communication with the intake manifold 14, the sensor 48 may alternatively be positioned in fluid communication with the intake conduit 20. In such embodiments that include the EGR system 35, the sensor 48 will generally be positioned in fluid communication with the intake conduit 20 but downstream of the junction of the intake conduit 20 and the EGR conduit 36.

The system 10 further includes an intake manifold pressure sensor 52 that is disposed in fluid communication with intake manifold 14 and electrically connected to an intake manifold pressure input, IMP, of the control circuit 42 via a signal path

54. The intake manifold pressure sensor 52 may be of known construction, and is operable to produce a pressure signal on the signal path 54 that is indicative of the pressure of the charge flowing into the intake manifold 14. Although the intake manifold pressure sensor 52 is illustrated in FIG. 1 as being positioned in fluid communication with the intake manifold 14, the sensor 52 may alternatively be positioned in fluid communication with the intake conduit 20.

Illustratively, as will be described in greater detail hereinafter, the control circuit 42 may be operable to estimate, e.g., as a function of one or more engine operating parameters, the flow rate of charge entering the intake manifold, i.e., the charge flow rate. Alternatively or additionally, as shown in phantom in FIG. 1, the system 10 may include a mass flow sensor 76 that is disposed in fluid communication with the intake conduit 20 (or alternatively in fluid communication with the intake manifold 14) and electrically connected to a charge mass flow input, CMF, of the control circuit 42 via a signal path 78. In this embodiment, the mass flow sensor 76 may be of known construction and be operable to produce a mass flow signal on the signal path 78 that is indicative of the mass flow rate of charge entering the intake manifold 14. In embodiments in which the sensor 76 is included in the system 10, the mass flow signal produced by the sensor 76 may be used to determine the mass flow rate of charge entering the intake manifold 14, i.e., the charge flow rate, in lieu of a charge flow estimation algorithm, or to supplement, compare with and/or diagnose, an estimated charge flow rate value produced by a charge flow estimation algorithm. In the former case, a charge flow estimation algorithm may additionally be used to provide an estimated charge flow rate value that may be used to supplement, compare with and/or diagnose the mass flow rate signal produced by the sensor 76.

In embodiments of the system 10 that include the EGR system 35, the system 10 further includes a differential pressure sensor, or ΔP sensor, 56 that is fluidly coupled at one end to the EGR conduit 36 adjacent to an exhaust gas inlet of the EGR valve 38 via a conduit 60, and that is fluidly coupled at its opposite end to the EGR conduit 36 adjacent to an exhaust gas outlet of the EGR valve 38 via a conduit 58. Alternatively, the ΔP sensor 56 may be fluidly coupled across another flow restriction or flow restriction mechanism disposed in-line with the EGR conduit 36. In either case, the ΔP sensor 56 may be of known construction and is electrically connected to a ΔP input of the control circuit 42 via signal a path 62. The ΔP sensor 62 is operable to provide a differential pressure signal on the signal path 62 that is indicative of the pressure differential across EGR valve 38 or other flow restriction or flow restriction mechanism disposed in-line with the EGR conduit 36.

In embodiments of the system 10 that include the EGR system 35, the system 10 further includes an EGR valve actuator 64 and an EGR valve position sensor 68 that operatively coupled to the EGR valve actuator 64. The EGR valve actuator 64 may be conventional and is electrically connected to an EGR valve control output, EGRC, of the control circuit 42 via a signal path 66. The EGR valve actuator 64 is responsive to EGR valve control signals produced by the control circuit 42 at the EGRC output to control the position of the EGR valve 38 relative to a reference position. In this regard, the EGR valve position sensor 68 is a conventional sensor that is electrically connected to an EGR valve position input, EGRP, of the control circuit 42 via a signal path 70, and that is operable to produce a position signal on the signal path 70 that is indicative of a position of the EGR valve 38 relative to a reference position. The control circuit 42 is operable, using known feedback control techniques, to control the EGR valve 38 to a desired EGR valve position by producing the EGR valve control signal, EGRC, on the signal path 66 based on the EGR valve position signal, EGRP, produced by the EGR valve position sensor 68 on the signal path 70. By controlling the position of the EGR valve 38, the control circuit 42 is thus operable to control the flow of recirculated exhaust gas from exhaust manifold 30 to intake manifold 14.

Illustratively, as will be described in greater detail hereinafter, the control circuit 42 may be operable in embodiments that include the EGR system 35 to estimate, e.g., as a function of one or more engine operating parameters, the flow rate of recirculated exhaust gas, i.e., the flow rate exhaust gas from the exhaust manifold 30 to the intake manifold 14 via the EGR valve 38 and conduit 36. Alternatively or additionally, as shown in phantom in FIG. 1, the system 10 may include a mass flow sensor 84 that is disposed in fluid communication with the EGR conduit 38 and electrically connected to an EGR mass flow input, EGRMF, of the control circuit 42 via a signal path 86. In this embodiment, the mass flow sensor 84 may be of known construction and be operable to produce a mass flow signal on the signal path 86 that is indicative of the mass flow rate of exhaust gas flowing through the EGR conduit 38 to the intake manifold 14 of the engine 12. In embodiments in which the sensor 84 is included in the system 10, the mass flow signal produced by the sensor 84 may be used to determine the mass flow rate of recirculated exhaust gas passing through the EGR conduit 38 and entering the intake manifold 14, i.e., the EGR flow rate, in lieu of an EGR flow estimation algorithm, or to supplement, compare with and/or diagnose, an estimated EGR flow rate value produced by an EGR flow estimation algorithm. In the former case, an EGR flow estimation algorithm may additionally be used to provide an estimated EGR flow rate value that may be used to supplement, compare with and/or diagnose the mass flow rate signal produced by the sensor 84.

Illustratively, as will be described in greater detail hereinafter, the control circuit 42 may be operable in some embodiments to estimate, e.g., as a function of one or more engine operating parameters, the temperature of the exhaust gas produced by the engine 12. Alternatively or additionally, as shown in phantom in FIG. 1, the system 10 may include an exhaust temperature sensor 80 that is disposed in fluid communication with the exhaust conduit 32 (or in fluid communication with the exhaust manifold 30) and electrically connected to an exhaust temperature input, ET, of the control circuit 42 via a signal path 82. In this embodiment, the engine exhaust temperature sensor 80 may be of known construction, and be operable to produce a temperature signal on signal path 82 that is indicative of the temperature of exhaust gas produced by engine 12. In embodiments in which the sensor 80 is included in the system 10, the exhaust temperature signal produced by the sensor 80 may be used to determine the temperature of exhaust gas produced by the engine 12 in lieu of an exhaust gas temperature estimation algorithm, or to supplement, compare with and/or diagnose, an estimated exhaust temperature value produced by an exhaust temperature estimation algorithm. In the former case, an exhaust temperature estimation algorithm may additionally be used to provide an estimated exhaust temperature value that may be used to supplement, compare with and/or diagnose the exhaust temperature signal produced by the sensor 80.

The system 10 may, in one or more embodiments, further include an engine temperature sensor 88 that is electrically connected to an engine temperature input, ENT, of the control circuit 42 via a signal path 90, as shown in phantom in FIG. 1. In embodiments that include the engine temperature sensor 88, the sensor 88 may illustratively be provided in the form of a conventional coolant temperature sensor configured to produce an engine temperature signal that is indicative of engine coolant temperature. Alternatively or additionally, the sensor 88 may be or include a conventional oil temperature sensor configured to produce an engine temperature signal that is indicative of engine oil temperature. In any case, the engine temperature signal produced by the engine temperature sensor 88 is indicative of the operating temperature of the engine 12.

The system 10 further includes a fuel system 72 that is electrically connected to a fuel command output port of the control circuit 42 via a number of signal paths 74. In the embodiment illustrated in FIGS. 1 and 2, the engine 12 is a conventional six-cylinder engine (e.g., cylinders C1-C6), and the fuel system 72 includes six corresponding fuel injectors, I1-I6, each disposed in fluid communication with a corresponding one of the six cylinders C1-C6. In the illustrated embodiment, the six fuel injectors I1-I6 are each fluidly coupled to a fuel rail 96 via a common fuel line 98, wherein the fuel rail holds pressurized fuel provided by a conventional fuel pump (not shown). The six fuel injectors I1-I6 are also electrically connected to the control circuit 42 via the signal paths 74. Each of the six fuel injectors I1-I6 are controlled individually by the control circuit 42, and the fuel command output port of the control circuit is thus labeled in FIG. 1 as FC1-FC6 to indicate that the control circuit 42 produces six separate fuel control signals on six corresponding signal paths 74. The fuel system 72 is generally responsive to the fueling commands FC1-FC6 produced by control circuit 42 on the signal paths 74 to supply fuel, via the fuel injectors I1-I6, to the engine 12, and the control circuit 42 is configured to produce such fueling commands FC1-FC6 in a manner well-known in the art. More specifically, the fueling commands FC1-FC6 each have a fuel timing component, FT, and a fuel flow component, FF.

Figure 2:
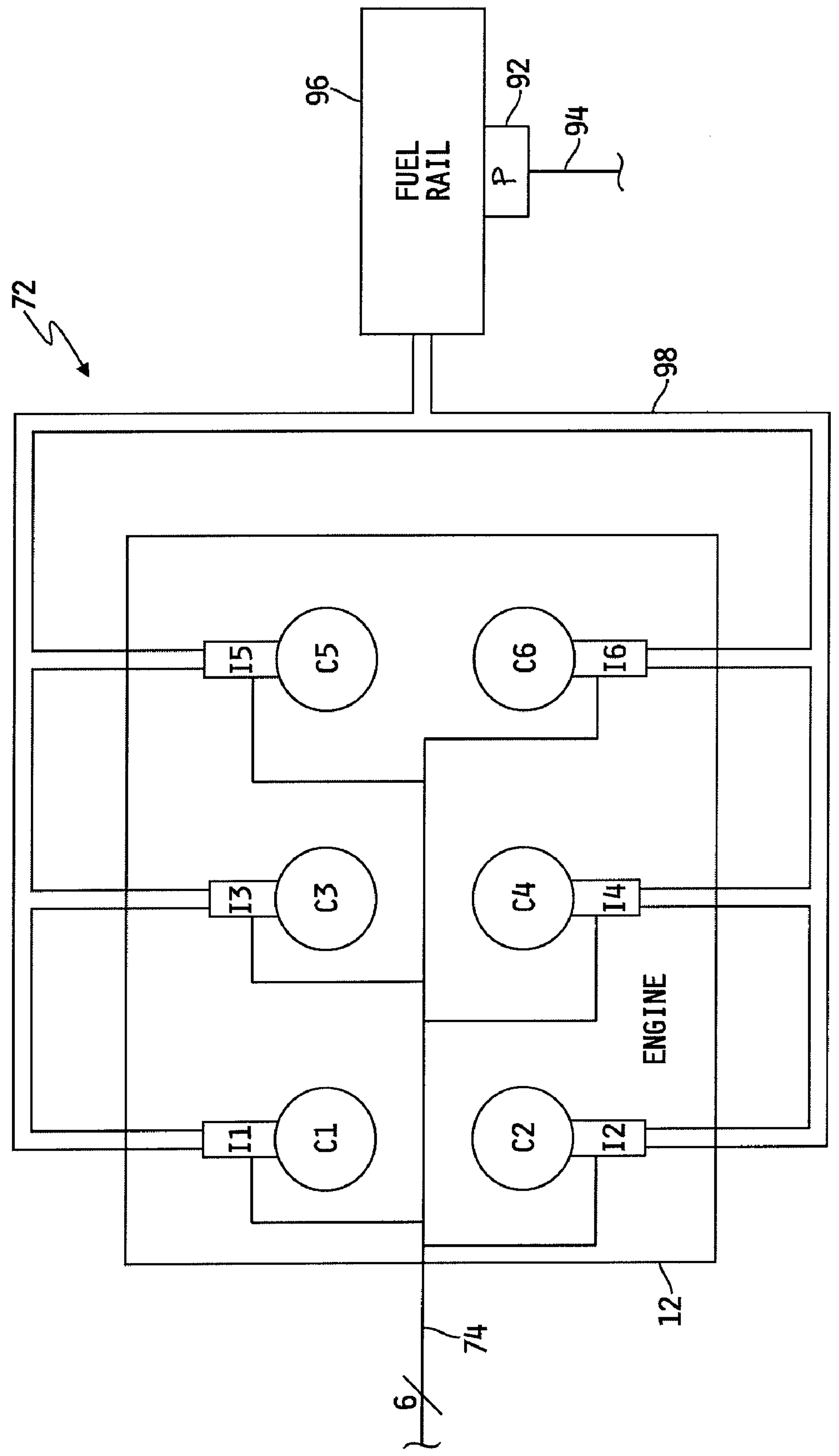
FIG. 2 is a block diagram of one illustrative embodiment of the fuel system depicted in FIG. 1.

The fuel timing component, FT, corresponds to the timing of injection of fuel by each of the fuel injectors I1-I6 relative to a reference timing. Illustratively, the fuel timing is based on the position, e.g., crank angle, of the engine 12 relative to a reference engine position, e.g., top-dead-center, TDC, of the piston (not shown) in each cylinder C1-C6. The control circuit 42 then controls, via the fuel timing component, FT, of the fueling commands FC1-FC6, a start-of-injection (SOI) for each fuel injector I1-I6 corresponding to the engine position, relative to the reference engine position, at which the fuel injector I1-I6 begins injecting fuel into a corresponding one of the cylinders C1-C6. The fuel flow component, FF, corresponds to the flow rate of fuel supplied by each of the fuel injectors I1-I6 to corresponding ones of the cylinders C1-C6. The fuel flow rate, FF, may typically be measured in units of $mm^3$/stroke. It will be understood that while a six-cylinder engine 12 is illustrated in FIG. 2, the engine 12 may alternatively have any number of cylinders, and the fuel flow rate, FF, corresponds to the flow rate of fuel supplied by any such number of fuel injectors to the engine 12.

In one or more embodiments, as shown in phantom in FIG. 1, the fuel system 72 may include a pressure sensor 92 that is electrically connected to a rail pressure input, RP, of the control circuit 42 via a signal path 94. As shown in FIG. 2, the pressure sensor 92 is fluidly coupled to the fuel rail 94 (or to the common fluid line 98), and the pressure signal produced by the sensor 92 is therefore indicative of the pressure fuel within the fuel rail 96, e.g., rail pressure.

This disclosure describes embodiments in which some of the information from which NOx produced by the engine is computed and/or derived may be estimated by one or more conventional estimation algorithms, i.e., so-called "virtual sensors." It will be understood that for the purposes of this disclosure, any one or more of the engine operating conditions from which NOx produced by the engine is computed and/or derived may be determined via one or more conventional estimation algorithms that is/are executed by the control circuit 42 to estimate one or more such engine operating conditions based on one or more other engine operating parameters.

Figure 4:
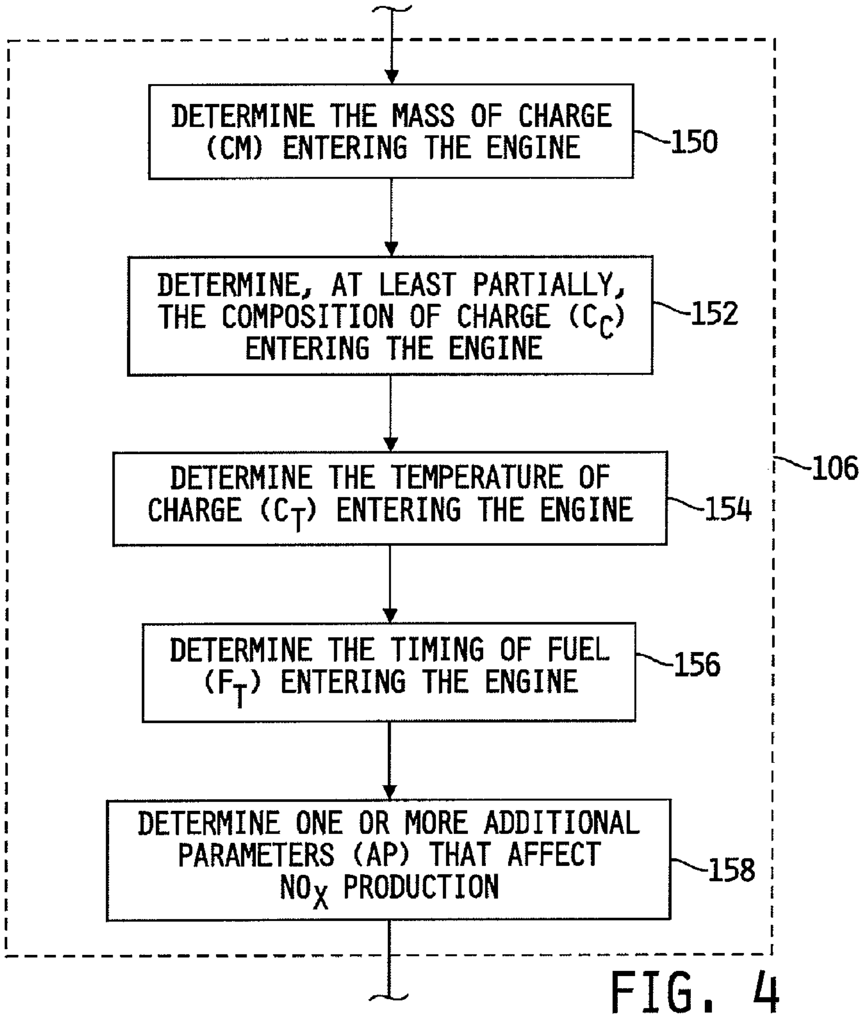
FIG. 4 is a flowchart of one illustrative embodiment of a process for carrying out monitoring one or more engine operating parameters in the process depicted in FIG. 3.

Referring now to FIG. 4, a flowchart is shown of one illustrative embodiment of a process 100 for estimating NOx produced by the engine 12. Illustratively, the process 100 is stored within the memory 45 of the control circuit 42 in the form of instructions that are executable by the control circuit 42 to estimate NOx produced by the engine 12. The process 100 begins at step 102, and thereafter at step 104 the control circuit 42 is operable to monitor the fuel flow rate, FF, corresponding to the flow rate of fuel supplied by the number of fuel injectors to the engine 12. Illustratively, the control circuit 42 is operable to execute step 104 by monitoring the fueling commands produced by the control circuit 42 and determining the fuel flow rate, FF, therefrom. Following step 104, the control circuit 42 is operable at step 106 to monitor a plurality of engine operating parameters, EOP. The plurality of engine operating parameters, EOP, monitored by the control circuit 42 at step 106 will generally include engine operating parameters that affect the amount and/or rate of NOx produced by the engine 12, and the accuracy of the estimated NOx value will generally depend, at least in part, upon the quality and quantity of the engine operating parameters, EOP, monitored at step 106. Examples of engine operating parameters, EOP, which may be monitored by the control circuit 42 at step 106 will be provided hereinafter.

From step 106, the process 100 advances to step 108 where the control circuit 42 is operable to retrieve a number of model constants, MC, from the memory 45. Generally, the number of model constants, MC, will be dictated by the choice of the NOx estimator model, and the values of the model constants, MC, will be determined using test data. One process for determining the model constants, MC, for one example NOx model will be described in an example provided hereinafter. From step 108, the process 100 advances to step 110 where the control circuit 42 is operable to compute an estimated NOx value, $NOx_E$, corresponding to an estimate of the NOx produced by the engine 12. In the illustrated process, the control circuit 42 is operable to compute $NOx_E$ based generally on a product of the flow rate of fuel, FF, and a function of the plurality of engine operating parameters, EOP. In equation form, and with the model constants, MC, included, the control computer 42 is operable at step 110 to compute $NOx_E$ according to the relationship $NOx_E = f(MC, FF)*f(MC, EOP)$, wherein f(MC, FF) represents a function of the fuel flow rate, FF, and at least one of the model constants, MC, and f(MC, EOP) represents a function of the plurality of engine operating parameters, EOP, and remaining ones of the model constants, MC.

Generally, this NOx estimator model is based primarily on the fuel flow rate, FF, and a function of a plurality of other engine operating parameters that affect NOx production. In one illustrative embodiment, the function of the plurality of engine operating conditions, EOC, is of the general form $(T_1+T_2+ \ldots +T_N)$, where each $T_X$ value corresponds to a different one of the plurality of engine operating conditions and where N may be any positive integer greater than 1. The NOx estimator model will then take the general form:

$$NOx_E=(K*FF)*(T_1+T_2+ \ldots +T_N) \quad (1),$$

where K represents one of the model constants, MC. With the remaining model constants included in equation (1), the NOx estimator model takes the general form:

$$NOx_E=(K*FF)[(C_1*T_1)+(C_2*T_2)+ \ldots +(C_N*T_N)] \quad (2),$$

where $C_1$, $C_2$ . . . , $C_N$ represent remaining ones of the model constants, MC. It will be understood that whereas equations (1) and (2) represent one illustrative embodiment of the NOx estimator model, other functions of the plurality of engine operating parameters, EOP, are contemplated by this disclosure.

Following step 110, the process 100 advances to step 112 where the control circuit 42 is operable to store the NOx estimate, $NOx_E$, in the memory 45. Illustratively, the memory 45 includes an accumulator that has stored therein an accumulated NOx estimate corresponding to an amount of NOx produced by the engine 12 since the accumulator was last reset. In this embodiment, the control circuit 42 is operable at step 112 to store the NOx estimate, $NOx_E$, in the memory 45 by adding the current value of $NOx_E$ to the accumulated NOx estimate stored in the accumulator of the memory 45. Those skilled in the art will recognize other conventional techniques for storing the NOx estimate, $NOx_E$, in the memory 45, and any such other conventional techniques are contemplated by this disclosure.

From step 112, the process 100 advances to step 114 where the control circuit 42 is operable to monitor the engine position, EP, and then to step 116 where the control circuit 42 is operable to determine, based on EP, whether the current engine cycle is complete. Illustratively, the control circuit 42 is operable to execute steps 114 and 116 by monitoring the signal produced by the engine speed and position sensor 44, and determining that the current engine cycle is complete when EP reaches a specified engine position. If, at step 114, the control circuit 42 determines that the current engine cycle is not complete, the process 100 loops back to step 114. If, at step 114, the control circuit 42 determines that the current engine cycle is complete, the process 100 loops back to step 104. The NOx estimate, $NOx_E$, is thus computed once per engine cycle in the illustrated embodiment, although it will be understood that the NOx estimate, $NOx_E$, may alternatively be computed more or less frequently.

Referring now to FIG. 4, a flowchart is shown of one illustrative embodiment of step 106 of the process 100, i.e., of monitoring a plurality of engine operating parameters. Generally, it has been determined that engine operating parameters that sufficiently affect NOx production so as to warrant inclusion in the NOx estimator model include, but should not be limited to, the mass, composition (at least partial composition) and temperature of the charge entering the engine 12, the timing of fuel entering the engine, i.e., the fuel timing component, FT, of the fuel commands produced by the control circuit 42, and possibly one or more additional parameters, ΔP, that affect NOx production. In the embodiment illustrated in FIG. 4, for example, step 106 begins at step 150 where the control circuit 42 is operable to determine the mass of the charge, CM, entering the engine. Thereafter at step 152, the control circuit 42 is operable to determine at least the partial composition of the charge, CC, entering the engine 12. Following step 152, the control circuit 42 is operable at step 154 to determine the temperature of the charge, $C_T$, entering the engine 12. Thereafter at step 156, the control circuit 42 is operable to determine the timing of fuel, FT, entering the engine 12. Following step 156, the control circuit 42 is operable to determine one or more additional parameters, ΔP, that may sufficiently affect NOx production so as to warrant inclusion in the monitored engine operating parameters, EOP.

In embodiments of the process 100 in which step 106 is implemented according to the process illustrated in FIG. 4, the NOx estimator model illustratively takes the form:

$$NOx_E=(K*FF)[(C_1*C_M)+(C_2*C_C)+(C_3*C_T)+(C_4*FT)+(C_5*\Delta P)+C_6] \quad (3),$$

where $C_M$ is the charge mass, $C_C$ is the charge composition, $C_T$ is the charge temperature, FT is the fuel timing, ΔP includes one or more additional parameters, i.e., additional engine operating conditions, and K and $C_1$-$C_6$ represent the model constants, MC. Examples of the one or more additional parameters, ΔP, may include, but should not be limited to, one or more of the rotational speed of the engine, which may be provided by the engine speed signal, ES, produced by the engine speed and position sensor 44, the operating temperature of the engine, which may be provided by the engine temperature signal, ET, produced by the engine temperature sensor 88 in the form of either or both of an engine coolant temperature signal and an engine oil temperature signal, and the fuel rail pressure, which may be provided by the fuel rail pressure signal, RP, produced by the pressure sensor 92.

Figure 5:
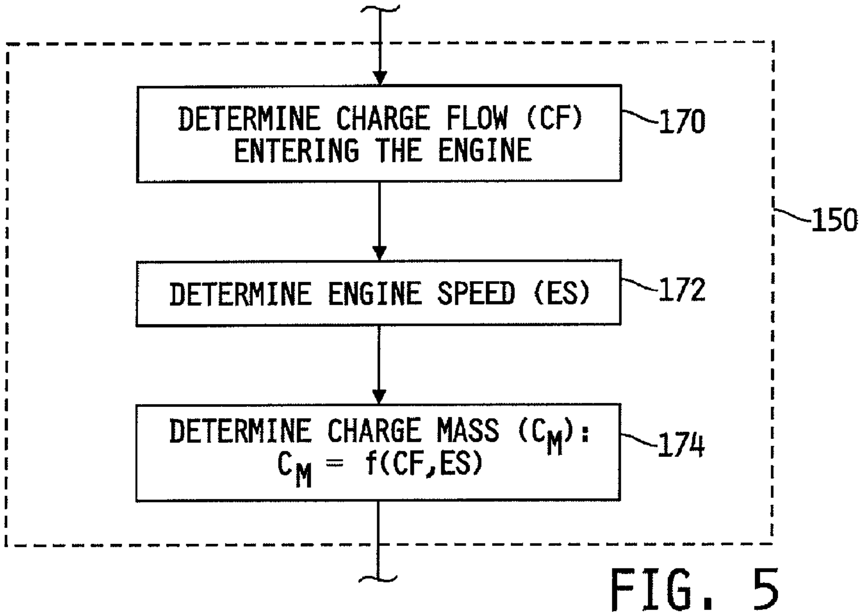
FIG. 5 is a flowchart of one illustrative embodiment of a process for carrying out determining the mass of charge in the process depicted in FIG. 4.

Referring now to FIG. 5, a flowchart is shown of one illustrative embodiment of step 150 of the engine operating parameter monitoring process of FIG. 4. In the embodiment illustrated in FIG. 5, step 150 begins at step 170 where the control circuit 42 is operable to determine the charge flow, CF, entering the engine, corresponding to the flow rate of charge entering the engine 12. In one embodiment, the control circuit 42 is operable to execute step 170 by determining CF according to a conventional charge flow estimation algorithm, one example of which will be described in detail hereinafter for one illustrative configuration of the engine 12. Alternatively, in embodiments of the system 10 that include the mass flow sensor 76, the control circuit 42 may be operable to execute step 170 by monitoring the signal produced by the mass flow sensor 76 and processing this signal in a known manner to determine the charge flow rate, CF. Thereafter at step 172, the control circuit 42 is operable to monitor engine speed, ES, corresponding to the rotational speed of the engine 12. Illustratively, the control circuit is operable to execute step 172 by monitoring the engine speed signal produced by the engine speed and position sensor 44 and processing this signal in a known manner to determine the engine speed value, ES. Thereafter at step 174, the control circuit is operable to determine the charge mass, CM, by computing CM as a function of the charge flow rate, CF, and the engine speed, ES, or CM=f (CF, ES). A specific example of the function for computing the charge mass, CM, for one illustrative engine configuration will be provided in an overall system example hereinafter.

Figure 6:
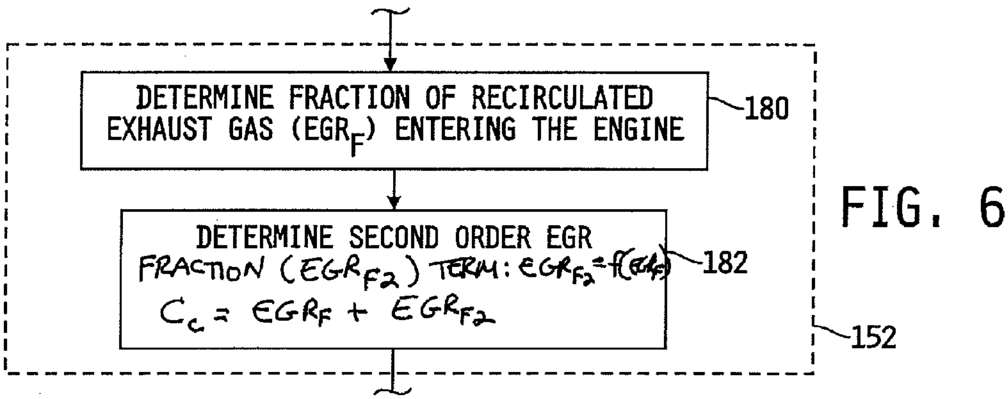
FIG. 6 is a flowchart of one illustrative embodiment of a process for carrying out determining, at least partially, the composition of charge in the process of FIG. 4.

Generally, the determination by the control circuit 42 of one or more of the engine operating parameters, EOP, according to the process of step 106 illustrated in FIG. 4 will depend, at least in part, on the configuration of the engine 12. For example, in embodiments in which the charge composition, $C_C$, is determined using a conventional estimation model, the form of this model may be different for engines that include the EGR system 35 than for those that do not. Referring to FIG. 6, for example, a flowchart is shown of one illustrative embodiment of step 152 of the engine operating parameter monitoring step 106 of FIG. 4 for an example engine configuration that includes the EGR system 35. In the illustrated embodiment, step 152 begins at step 180 where the control circuit 42 is operable to determine a fraction of recirculated exhaust gas, $EGR_F$, in the charge entering the engine. Illustratively, as will be described in greater detail in the following system example, the control circuit 42 may be operable to determine $EGR_F$ by first determining the flow rate of recirculated exhaust gas, $EGR_F$, and the flow rate of charge entering the engine 12, CF, and computing $EGR_F$ as a ratio of $EGR_F$ and CF. It will be understood, however, that this disclosure contemplates other conventional techniques for determining the fraction of recirculated exhaust gas in the charge entering the engine 12.

It will be understood that any of the plurality of engine operating conditions, EOC, may be or include higher order EOC terms. In the process illustrated in FIG. 6, for example, the charge composition, $C_C$, further includes a second order EGR fraction component which affects NOx production. More specifically, step 180 advances to step 182 where the control circuit 42 is operable to compute a second order EGR fraction term, $EGR_{F2}$, as a function of the EGR fraction, $EGR_F$. A specific example of the function for computing $EGR_{F2}$ as a function of $EGR_F$ for one illustrative engine configuration will be provided in the following overall system example hereinafter.

EXAMPLE

Figure 7:
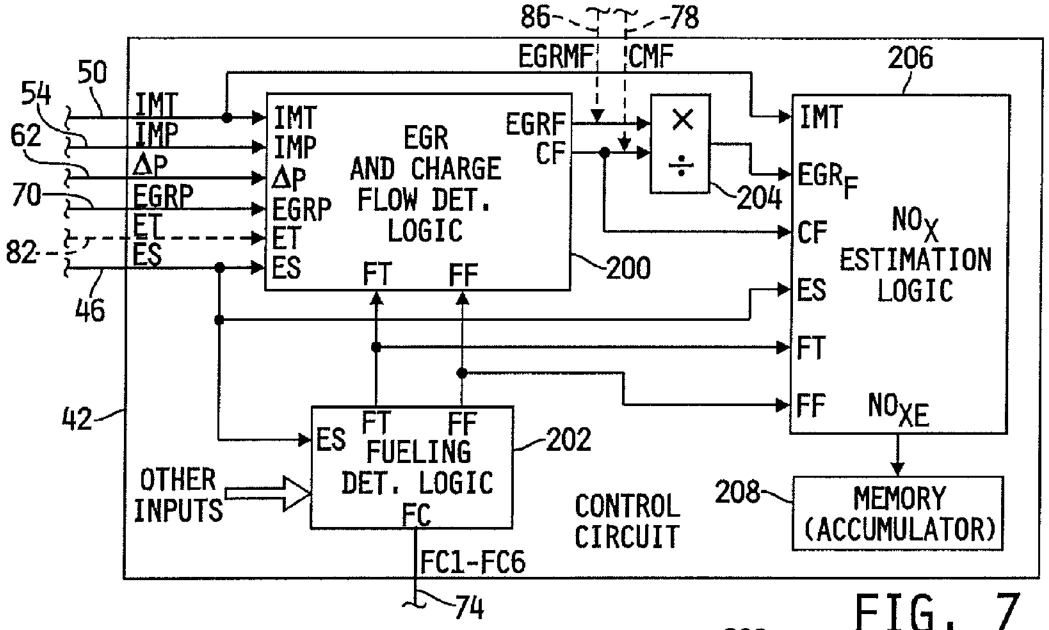
FIG. 7 is a block diagram of one illustrative embodiment of the control circuit of FIG. 1 configured to estimate NOx produced by the engine according to one specific implementation of the processes of FIGS. 3-6.

Referring now to FIG. 7, one illustrative embodiment of some of the functional features of the control circuit 42 is shown for one specific implementation of the engine 12. It will be understood that the logic components shown in FIG. 7 are provided only by way of example, and that the NOx estimator model may alternatively be adapted for other implementations of the engine 12 as described hereinabove. For the embodiment illustrated in FIG. 7, the engine 12 is a 6-cylinder internal combustion engine that includes the turbocharger 18 and the EGR system 35. Illustratively, the control circuit 42 includes conventional EGR and charge flow determination logic 200 that is configured to estimate the charge flow rate, CF, and the recirculated exhaust gas flow rate, $EGR_F$, as a function of a plurality of engine operating parameters. The control circuit 42 further includes an arithmetic block 204 having a multiplication input that receives the EGR flow rate value, $EGR_F$, and a division input that receives the charge flow rate value, CF, and produces at an output the EGR fraction value, $EGR_F$, as a ratio of $EGR_F$ and CF. Alternatively to the EGR and charge flow determination logic block 200, the EGR flow rate and charge flow rate values may be determined from EGR mass flow rate and charge mass flow rate signals received from corresponding mass flow rate sensors 76 and 84 respectively in embodiments that include such mass flow rate sensors. In any case, the control circuit 42 further includes conventional fueling determination logic 202 that is configured to receive the engine speed signal, ES, and other inputs, and to compute the fueling commands, FC1-FC6, as a function thereof in a conventional manner. The corresponding fuel flow rate, FF, and fuel timing, FT, values are provided as inputs to the EGR and charge determination logic block 200.

Figure 8:
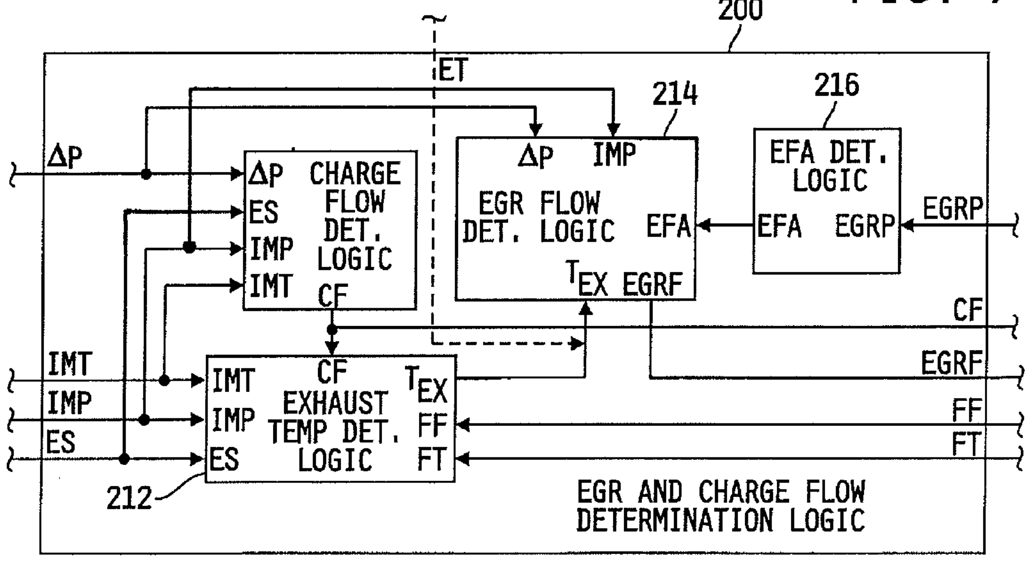
FIG. 8 is a block diagram of one illustrative embodiment of the EGR and charge flow determination logic block of FIG. 7.

Referring now to FIG. 8, a block diagram is shown of one illustrative embodiment of the EGR and charge flow determination logic 200 of FIG. 7. The logic block 200 of FIG. 8 includes a charge flow determination logic block 210 receiving as inputs the pressure differential signal, ΔP, on signal path 62, the intake manifold temperature signal, IMT, on signal path 50, the intake manifold pressure signal, IMP, on signal path 54, and the engine speed signal, ES, on signal path 46. The charge flow determination logic block 210 is configured to process these input signals and produce the charge flow value, CF, as a function thereof. The logic block 200 further includes an exhaust gas temperature determination logic block 212 that receives as inputs the charge flow value, CF, the intake manifold temperature signal, IMT, on signal path 50, the intake manifold pressure signal, IMP, on signal path 54, the engine speed signal, ES, on signal path 46, and the fuel flow and fuel timing values, FF and FT respectively, produced by the fueling determination logic block 202. The exhaust temperature determination logic block 212 is configured to process these input signals and produce an estimated exhaust temperature value, $T_{EX}$, as a function thereof. In embodiments of the system 10 that include the exhaust temperature sensor 80, the exhaust temperature signal, ET, produced by the temperature sensor 80 may be provided directly to the EGR flow determination logic block 214 and the exhaust temperature determination block 212 may be omitted. The logic block 200 further includes an EGR flow determination logic block 214 receiving as inputs the pressure differential signal, ΔP, on signal path 62, the intake manifold pressure signal, IMP, on signal path 54, the exhaust temperature value, $T_{EX}$, produced by the exhaust temperature determination logic block 212 and an effective flow area value, EFA, produced by an effective flow area determination logic block 216. The EGR flow determination logic block 214 is configured to process these input signals and produce the EGR flow value, $EGR_F$, as a function thereof. The effective flow area determination logic block 216 receives the EGR valve position signal, EGRP, on signal path 70, and is configured to process this signal to determine and produce an effective flow area value, EFA, corresponding to an effective flow area through the EGR valve 36.

The charge flow determination logic block 210 is operable to compute an estimate of charge flow, CF, by first estimating the volumetric efficiency ($\eta_v$) of the charge intake system, and then computing CF as a function of $\eta_v$ using a conventional speed/density equation. Any known technique for estimating $\eta_v$ may be used, and in one illustrative embodiment of the logic block 210, $\eta_v$ is computed according to a known Taylor mach number-based volumetric efficiency equation given as:

$$\eta_v = A_1 * \{(\mathrm{Bore}/D)^2 * (\mathrm{stroke} * ES)^B / \mathrm{sqrt}(\gamma * R * IMT)[(1 + EP/IMP) + A_2)]\} + A_3 \quad (4),$$

where, $A_1$, $A_2$, $A_3$ and B are all calibratible parameters that are fit to the volumetric efficiency equation based on mapped engine data, Bore is the intake valve bore length, D is the intake valve diameter, stroke is the piston stroke length, wherein Bore, D and stroke are dependent upon engine geometry, γ and R are known constants (e.g., γR=387.414 J/kg/deg K), ES is engine speed, IMP is the intake manifold pressure, EP is the exhaust pressure, where EP=IMP+ΔP, and IMT is the intake manifold temperature.

With the volumetric efficiency value $\eta_v$ estimated according to equation (5), the charge flow value, CF, is computed by the block 210 according to the equation:

$$CF = \eta_v * V_{DIS} * ES * IMP / (2 * R * IMT) \quad (5),$$

where, $\eta_v$ is the estimated volumetric efficiency, $V_{DIS}$ is engine displacement and is generally dependent upon engine geometry, ES is engine speed, IMP is the intake manifold pressure, R is a known gas constant (e.g., R=53.3 ft-lbf/lbm deg R or R=287 J/Kg deg K), and IMT is the intake manifold temperature.

The exhaust temperature determination logic block 212 is operable to compute an estimate of the engine exhaust temperature, $T_{EX}$, according to the model:

$$T_{EX} = IMT + [(A * ES) + (B * IMP) + (C * FT) + D)] * [(LVH * FF) / CF] \quad (6),$$

where A, B, C, and D are model constants, and LHV is a lower heating value of the fuel which is a known constant depending upon the type of fuel used by the engine 12. Further details relating to this and other engine exhaust temperature models are provided in U.S. Pat. No. 6,508,242, which is assigned to the assignee of this disclosure, and the disclosure of which is incorporated herein by reference.

The EGR flow determination logic block 214 is operable to compute an estimate of the EGR flow rate value, EGRF, according to the model:

$$EGR_F = EFA * \text{sqrt}[(2*\Delta P*IMP)/(R*T_{EX})] \quad (7),$$

where R is a known gas constant as identified hereinabove. The effective flow area determination block 216 illustratively includes one or more equations, graphs and/or tables relating EGR position, EGRP, to effective flow area values, EFA. It is to be understood that equation (7), as well as the computation of the EGR fraction value, $EGR_F$, described hereinabove represent simplified approximations of these two parameters based on assumptions of constant exhaust gas temperature through the EGR valve 38 and steady state flow of exhaust gas through EGR valve 38, and neglecting effects resulting from a variable time delay between the passage of recirculated exhaust gas through EGR valve 38 and arrival of the corresponding EGR fraction in the engine cylinders. Further details relating to strategies for addressing such assumptions are described in U.S. Pat. No. 6,837,227 which is assigned to the assignee of this disclosure, and the disclosure of which is incorporated herein by reference.

Figure 3:
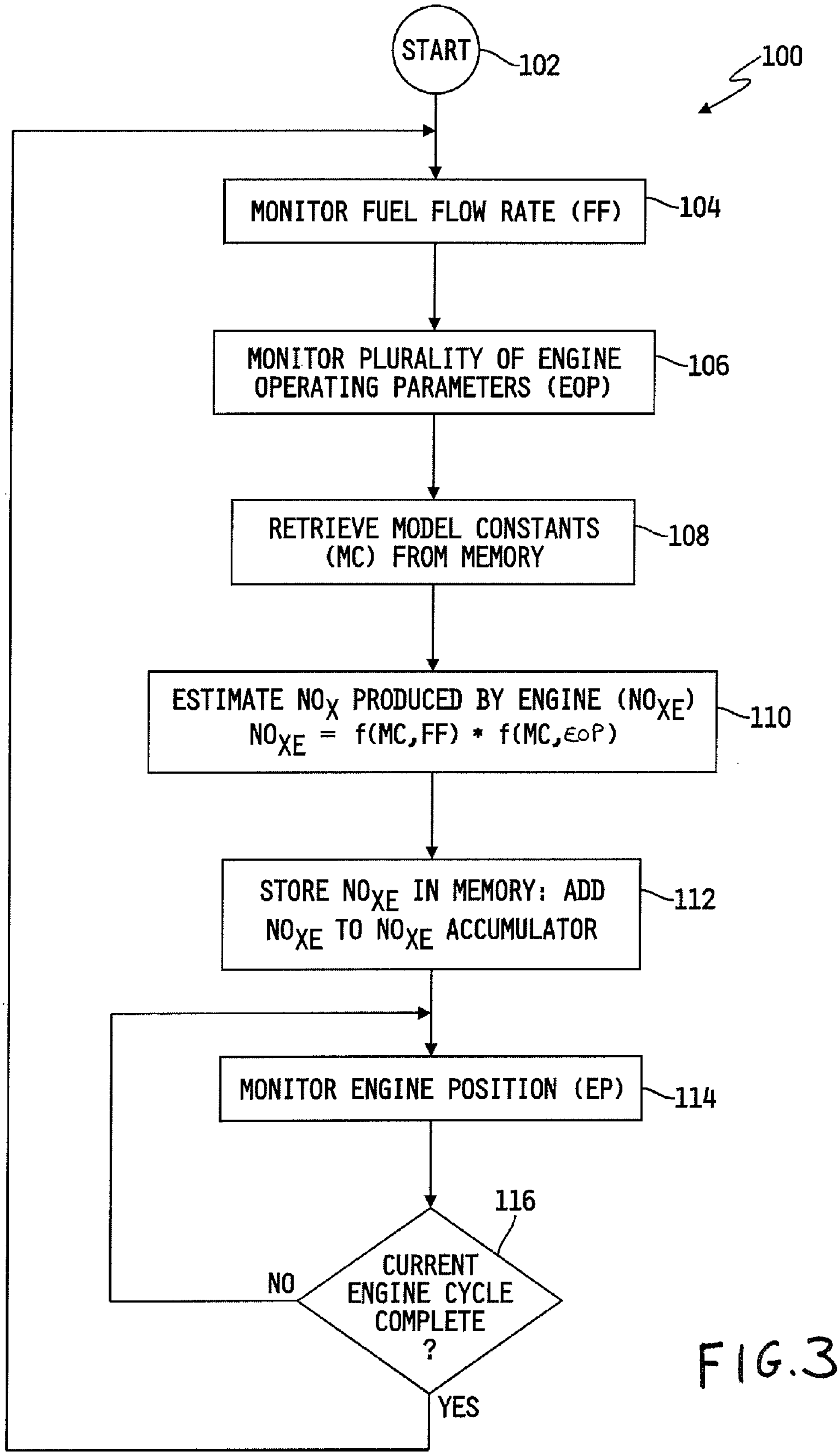
FIG. 3 is a flow chart of one illustrative embodiment of a process for estimating NOx produced by an internal combustion engine.

The control circuit 42, in the embodiment illustrated in FIG. 7, further includes NOx determination logic 206 that is configured to compute an estimated NOx value, $NOx_E$, and to store $NOx_E$ in a memory location 208, e.g., a NOx estimate accumulator as described hereinabove. The NOx determination logic 206 includes the process 100 illustrated in FIG. 3, as well as the processes illustrated in FIGS. 4-6, in the form of instructions that are executable by the control circuit 42 to determine NOx produced by the engine. In this example, the NOx determination logic 206 includes a specific implementation of the NOx estimator model of equation (3) above in which the additional parameters, ΔP, includes only the engine speed, ES, the charge mass term, $C_M$, is computed at step 174 according to the equation $C_M=[(333.3*CF)/ES]$, the charge composition term, $C_C$, is computed at steps 180 and 182 as the sum of $EGR_F$ and $EGR_{F2}$, wherein $EGR_{F2}$ is computed at step 182 according to the equation $EGR_{F2}=(1-EGR_F)^2$, and the charge temperature term, $C_T$, is determined from the temperature signal, IMT, produced by the intake manifold temperature sensor 48. Substituting these relationships into equation (3) yields the following NOx estimation model:

$$NOx_E=(K*FF)[(C[(333.3*CF)/ES])+(C_{21}*EGR_F)+(C_{22}*(1-EGR_F)^2)+(C_3*IMT)+(C_4*FT)+(C_5*ES)+C_6] \quad (8),$$

where CF is the charge flow rate (kg/min), ES is the rotational speed of the engine 12 (rpm), $EGR_F$ is the fraction of recirculated exhaust gas in the charge entering the engine 12, IMT is the intake manifold temperature, FT is the fuel timing value, and K and $C_1$-$C_6$ are model constants, and the constant $C_2$ is modified to form two separate constants $C_{21}$ and $C_{22}$.

One illustrative technique for determining the model constants is a Monte-Carlo style sampling of random points. An initial calibration tool is run until a fit better than a first threshold, e.g., $R^2>0.8$, is found. A conventional global optimization routine is then run on the nominal solution. This approach typically yields $R^2>0.9$ on the calibration data sets, and near or above $R^2>0.9$ on secondary data sets. A calibration data set is generally the data set from which the model constants are generated, and a secondary data set is one that is generated by the same or similar engine 12 after the model constants are generated. One illustrative procedure for calibrating the model constants using this approach is as follows:

1. Set up equation (8), using test data for $NOx_E$, with nominal values, e.g., 0.1, for the constants K, $C_1$, $C_3$-$C_6$, $C_{21}$ and $C_{22}$.
2. Compare the test $NOx_E$ data to the model data to determine error values, e.g., $R^2$, etc. Percent NOx error is illustratively used, although absolute NOx error may alternatively be used.
3. Run the initial optimizer to determine a "nominal solution." This should be run until $R^2>0.85$ or so to ensure a better final solution.
4. Run a conventional optimizer to minimize the sum of error terms, to minimize the sum of the $\text{error}^2$ terms or to minimize some other error function.

The step 3 initial optimizer may illustratively operate as follows:

1. Read in a wormhole rate (e.g., 20-200 per 1000). The optimizer randomly adjusts the calibration terms in a small range, but allows a wormhole on occasion to change a term dramatically.
2. Read in the current RSQ value.
3. Start a counter for number of iterations:
   a) Change each parameter to get a high value, low value, and original value:
      i) If no wormhole: +/− random 0-1%; i.e. new value between 0.99 and 1.01 of old value. Parameter may be allowed to cross zero if the sign of the relationship is uncertain.
      ii) If a wormhole: +/− random 0-100%; i.e. new value between 0.01 and 2.00 of old value. Parameter may be allowed to cross zero if the sign of the relationship is uncertain, otherwise zero crossing can be disabled (have to make a small absolute change rather than percentage change to cross zero).
   b) Repeat a) until all parameters are checked. Each cycle, the parameters should be changed in a random order.
4. Increment the iterator.
5. If the iterator is <threshold, go back to 3, else end the iterator.

Generally, between 400 to as high as several thousand iterations may be required to converge on an $R^2>0.85$ solution. Wormhole rates may be 0-1000. Wormhole rates above 200 may create strange solution sets that need to be scaled later, and wormhole rates above 400 may cause the convergence time to lengthen significantly due to a large number of useless checks.

The final optimization from the nominal solution to minimizing the error terms can be performed with any conventional optimizer. Such optimizers typically find local minimums quickly, although if a conventional optimizer is utilized before a nominal solution, the $R^2$ can converge on 0.6-0.7 or worse, and may not likely yield a good final solution. If the nominal solution is first determined as described above, a conventional optimizer will typically bring the $R^2$ value above 0.9

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A method of estimating NOx produced by an internal combustion engine, the method comprising:
   - monitoring a flow rate of fuel supplied to the engine,
   - monitoring a plurality of engine operating parameters,
   - determining a number of model constants,
   - estimating NOx produced by the engine based on a product of a first function and a second function, the first function being a function of the flow rate of fuel and at least one of the model constants, and the second function being a function of the plurality of engine operating parameters and remaining ones of the model constants, and
   - storing the NOx estimate in memory,
   - wherein monitoring a plurality of engine operating parameters comprises determining a charge composition value corresponding to at least a partial composition of charge entering the engine.

2. The method of claim 1 wherein monitoring a flow rate of fuel, monitoring a plurality of engine operating parameters, determining a number of model constants, estimating NOx produced by the engine and storing the NOx estimate in memory are all carried out once per engine cycle.

3. The method of claim 1 wherein storing the NOx estimate in memory comprises adding the NOx estimate to an accumulated NOx estimate value in memory.

4. The method of claim 1 wherein monitoring a plurality of engine operating parameters comprises determining a charge mass value corresponding to at least a partial composition of charge entering the engine.

5. The method of claim 1 wherein monitoring a plurality of engine operating parameters comprises determining a charge temperature value corresponding to a temperature of charge entering the engine.

6. The method of claim 1 wherein monitoring a plurality of engine operating parameters comprises determining a fuel timing value corresponding to a timing of fuel supplied to the engine relative to a reference timing value.

7. The method of claim 1 wherein monitoring a plurality of engine operating parameters comprises determining a rotational speed of the engine.

8. The method of claim 1 wherein monitoring a plurality of engine operating parameters comprises determining an operating temperature of the engine,
   - and wherein determining an operating temperature of the engine comprises determining at least one of a coolant temperature corresponding to a temperature of coolant circulating through the engine and determining a temperature of oil within the engine.

9. The method of claim 1 wherein a fuel system includes a fuel rail fluidly coupled to a number of fuel injectors, the number of fuel injectors configured to selectively supply fuel to the engine from the fuel rail,
   - and wherein monitoring a plurality of engine operating parameters comprises determining a fuel rail pressure corresponding to a pressure of fuel within the fuel rail.

10. The method of claim 1 wherein each of the plurality of engine operating parameters is represented by an engine operating parameter variable $T_N$, where N is a positive integer greater than 1,
   - and wherein estimating NOx comprises estimating NOx produced by the engine ($NOx_E$) according to the equation $$NOx_E=(K*FF)*[(C_1*T_1)+(C_2*T_2)+\ldots+(C_N*T_N)],$$

where FF is the fuel flow rate, and K and $C_1$, $C_2$, . . . $C_N$ comprise the number of model constants.

11. A method of estimating NOx produced by an internal combustion engine, the method comprising:
   - determining a fuel flow rate corresponding to a flow rate of fuel supplied to the engine,
   - determining a fuel timing corresponding to a timing of fuel supplied to the engine relative to a reference timing value,
   - determining an engine speed corresponding to rotational speed of the engine,
   - determining a charge mass corresponding to a mass of charge entering the engine,
   - determining a charge composition corresponding to at least a partial composition of charge entering the engine,
   - determining a charge temperature corresponding to a temperature of charge entering the engine,
   - estimating NOx produced by the engine as a function of the fuel flow rate, fuel timing, engine speed, charge mass, charge composition and charge temperature, and
   - storing the NOx estimate in memory.

12. The method of claim 11 wherein determining a fuel flow rate, determining a fuel timing, determining an engine speed, determining a charge mass, determining a charge composition, determining a charge composition, estimating, estimating NOx produced by the engine and storing the NOx estimate in memory are carried out once per engine cycle.

13. The method of claim 11 wherein storing the NOx estimate in memory comprises adding the NOx estimate to an accumulated NOx estimate value in memory.

14. The method of claim 11 wherein estimating NOx comprises estimating NOx produced by the engine ($NOx_E$) according to the function $$NOx_E=(K*FF)*[(C_1*C_M)+(C_2*C_C)+(C_3*C_T)+(C_4*FT)+(C_5*ES)+C6],$$

where FF is the fuel flow rate, $C_M$ is the charge mass, $C_C$ is the charge composition, $C_T$ is the charge temperature, FT is the fuel timing, ES is the engine speed, and K and $C_1$-$C_6$ are model constants.

15. The method of claim 14 wherein determining a charge mass comprises:
   - determining a charge flow corresponding to a flow rate of charge entering the engine, and
   - determining the charge mass as a function of the charge flow and the engine speed.

16. The method of claim 15 wherein determining a charge composition comprises determining an EGR fraction corresponding to a fraction of recirculated exhaust gas in the charge supplied to the engine.

17. The method of claim 16 wherein determining an EGR fraction comprises:
   - determining an EGR flow corresponding to a flow rate of recirculated exhaust gas entering the engine, and
   - determining the EGR fraction value as a function of the charge flow and the EGR flow.

18. The method of claim 17 wherein determining a charge composition value further comprises:
   - determining a second order EGR fraction value as a function of the EGR fraction value, and
   - computing the charge composition value as a sum of the EGR fraction value and the second order EGR fraction value such that estimating NOx comprises estimating NOx produced by the engine according to the function $$NOx_E=(K*FF)*[(C_1f(CF,ES))+(C_2*[EGR_F+f(EGR_F))+(C_3*C_T)+(C_4*FT)+(C_5*ES)+C_6],$$

where CF is the charge flow, f(CF, ES) is the charge mass, $EGR_F$ is the EGR fraction value and $f(EGR_F)$ is the second order EGR fraction value.

19. A system for estimating NOx produced by an internal combustion engine, the system comprising:

a fuel system coupled to a source of fuel and to the engine and configured to supply fuel from the source of fuel to the engine, means for determining a charge composition value corresponding to at least a partial composition of the charge entering the engine, and a control circuit including a memory having stored therein instructions that are executable by the control circuit to determine a fuel flow value corresponding to a flow rate of fuel supplied by the fuel system to the engine, to determine a plurality of operating parameters associated with operation of the engine, the plurality of operating parameters including the charge composition value, to estimate NOx produced by the engine as a product of the fuel flow value and a function of the plurality of operating parameters and to store the estimated NOx in the memory.

20. The system of claim 19 wherein the memory includes an accumulator having stored therein an accumulated NOx estimate value, and wherein the instructions further include instructions that are executable by the control circuit to store the estimated NOx in the memory by adding the estimated NOx to the accumulated NOx estimate value stored in the memory.

21. The system of claim 19 further comprising:

means for determining a charge mass value corresponding to a mass of charge entering the engine, means for determining a charge temperature corresponding to a temperature of the charge entering the engine, means for determining a fuel timing value corresponding to a timing fuel supplied to the engine relative to a reference time value, and means for determining an engine speed value corresponding to a rotational speed of the engine, wherein the plurality of operating parameters associated with operation of the engine include the charge mass value, the charge temperature value, the fuel timing value and the engine speed value.

22. The system of claim 21 further comprising a number of model constants stored in the memory, wherein the instructions further include instructions to estimate the NOx produced by the engine ($NOx_E$) according to the equation $$NOx_E=(K*FF)*[(C_1*C_M)+(C_2*C_C)+(C_3*C_T)+(C_4*FT)+(C_6*ES)+C6],$$

where FF is the fuel flow rate, $C_M$ is the charge mass, $C_C$ is the charge composition, $C_T$ is the charge temperature, FT is the fuel timing, ES is the engine speed, and K and $C_1$-$C_6$ comprise the number of model constants.

23. The system of claim 22 wherein the means for determining a charge composition value comprises means for determining an EGR fraction value corresponding to a fraction of recirculated exhaust gas in the charge entering the engine.

24. The system of claim 23 wherein the means for determining a charge composition value further comprises means for determining a second order EGR fraction value as a function of the EGR fraction value and for determining the charge composition value as a sum of the EGR fraction value and the second order EGR fraction value.

* * * * *